(12) United States Patent
Dancy et al.

(10) Patent No.: US 7,867,067 B2
(45) Date of Patent: Jan. 11, 2011

(54) SHRIMP PROCESSING MACHINE

(75) Inventors: Michael Dancy, Gurnee, IL (US); Jon T. Keith, Wheeling, IL (US)

(73) Assignee: Gregor Jonsson Inc., Lake Forest, IL (US)

( * ) Notice: Subject to any disclaimer, the term of this patent is extended or adjusted under 35 U.S.C. 154(b) by 119 days.

(21) Appl. No.: 12/402,614

(22) Filed: Mar. 12, 2009

(65) Prior Publication Data

US 2010/0233948 A1    Sep. 16, 2010

(51) Int. Cl.
*A22C 29/02* (2006.01)
(52) U.S. Cl. .......................................................... 452/5
(58) Field of Classification Search ................ 452/1–10
See application file for complete search history.

(56) References Cited

U.S. PATENT DOCUMENTS

| | | | | |
|---|---|---|---|---|
| 4,472,858 A | * | 9/1984 | Keith | 452/3 |
| 4,769,871 A | * | 9/1988 | Betts | 452/3 |
| 5,035,670 A | * | 7/1991 | Pershinske | 452/5 |
| 6,485,363 B2 | * | 11/2002 | Keith | 452/3 |
| 6,488,576 B1 | * | 12/2002 | Shelton | 452/3 |
| 6,533,651 B2 | * | 3/2003 | Keith | 452/3 |

* cited by examiner

*Primary Examiner*—Thomas Price
(74) *Attorney, Agent, or Firm*—Marshall, Gerstein & Borun LLP

(57) ABSTRACT

A clamp assembly for a shrimp processing machine includes a center bracket and first and second clamps. The center bracket defines a support surface for supporting a shrimp. The first and second clamps are mounted relative to the center bracket and movable between an open position and a closed position. The first clamp includes a first jaw including a first engaging surface for engaging a first side shell portion of the shrimp in the closed position. The second clamp includes a second jaw including a second engaging surface for engaging a second side shell portion of the shrimp in the closed position. Additionally, a shoulder extends from the second jaw away from support surface of the center bracket for applying a force to the shell when the second clamp moves toward the closed position to roll the shrimp toward the first clamp and tear the shrimp shell.

19 Claims, 9 Drawing Sheets

SHRIMP PROCESSING MACHINE

FIELD OF THE INVENTION

The invention generally relates to a machine for processing shrimp, and more particularly, to a semi-automated machine for processing shrimp.

BACKGROUND

Various types of automated or semi-automated shrimp processing machines are commercially available. Typical shrimp processing machines are adapted to partially or completely remove the shell of the shrimp, thereby readying the shrimp meat for cooking and consumption, for example. Additionally, some shrimp processing machines are adapted to cut the shrimp meat as part of the preparation process. For example, some machines are adapted to provide a butterfly style cut or a western style cut to the shrimp meat.

One known style of shrimp processing machine includes a main wheel equipped with a plurality of clamps spaced about its periphery. This type of machine also includes a loading tray for presenting the shrimp to the main wheel. The shrimp are loaded onto the loading tray by an operator. As the clamps pass the trays, they are loaded with shrimp. Once the clamps are loaded, the main wheel continues to rotate, thereby moving each shrimp through various processing stations such as a cutting station and a meat picking station, for example. The cutting station typically cuts the dorsal side of the shrimp shell and optionally the meat, and the meat picking station removes the meat from the shell.

In such conventional shrimp processing machines, the shrimp can be picked with a fork type mechanism that includes a plurality of tines that pass through the cut in the shrimp shell and into the dorsal side of the meat. In some conventional machines, the tines are then moved along a path that is generally along the longitudinal direction of the shrimp, thereby sliding the meat from the shell. Once the meat is removed from the shell, it can be removed from the tines for further processing and/or packaging.

SUMMARY

One embodiment of the present disclosure provides a clamp assembly for a shrimp processing machine that includes a center bracket, first and second clamps, first and second jaws, and a shoulder. The center bracket defines a support surface for supporting the ventral side of a shrimp during a shrimp preparation process. The first clamp is mounted relative to the center bracket. The second clamp is mounted relative to the center bracket. The first and second clamps are movable relative to each other between an open position and a closed position. The first jaw is carried by the first clamp and includes a first engaging surface for engaging at least a first side shell portion of the shrimp when the first clamp moves toward the closed position. The second jaw is carried by the second clamp and includes a second engaging surface. The second engaging surface is disposed opposite the first engaging surface and is for engaging at least a second side shell portion of the shrimp that is disposed opposite the first side shell portion of the shrimp when the second clamp moves toward the closed position. The shoulder is carried by the second jaw at a location adjacent the second engaging surface. The shoulder extends from the second jaw away from support surface of the center bracket and is adapted to engage and apply a force to the second side shell portion of the shrimp when the second clamp moves toward the closed position to roll the shrimp toward the first clamp.

In one embodiment, the shoulder includes a wedge surface disposed at an angle that is less than ninety degrees relative to the second engaging surface. The wedge surface is for engaging the second side shell portion of the shrimp when the second clamp moves toward the closed position.

In one embodiment, the clamp assembly further comprises a first plurality of teeth extending from the first engaging surface and a second plurality of teeth extending from the second engaging surface. The first and second pluralities of teeth are adapted to penetrate the first and second side shell portions of the shrimp, respectively, when the first and second clamps move toward the closed position.

In one embodiment, the first plurality of teeth are offset from the second plurality of teeth such that the first and second pluralities of teeth are interleaved when the first and second jaws move toward the closed position.

In one embodiment, each of the second plurality of teeth has a thickness that is larger than a thickness of each of the first plurality of teeth such that the second plurality of teeth create a perforated seam along the second side shell portion of the shrimp. The perforated seam is torn when the shoulder on the second jaw rolls the shrimp toward the first jaw.

In one embodiment, the clamp assembly further comprises an asymmetrical gap disposed between the first and second engaging surfaces of the first and second clamps. The gap is adapted to receive at least the first and second side shell portions of the shrimp.

In one embodiment, the first and second engaging surfaces are disposed at an angle relative to each other.

In one embodiment, the first engaging surface is disposed substantially perpendicularly to a direction of movement of the first and second clamps toward the closed position, and the second engaging surface is disposed at an angle that is less than ninety degrees relative to the direction of movement of the first and second clamps toward the closed position.

In one embodiment, the first jaw includes a receiving surface disposed perpendicularly to the first engaging surface. The receiving surface is adapted to receive the shrimp as it is rolled toward the first clamp and is disposed closer to the center bracket than the shoulder on the second jaw.

Another aspect of the present disclosure provides a shrimp processing machine including a clamp assembly and a picking assembly. The clamp assembly comprises a center bracket and first and second jaws. The center bracket has a support surface and the first and second jaws adapted to engage opposite sides of a shrimp to secure the ventral side of the shrimp on the support surface. The picking assembly is for removing the meat of the shrimp from the shell of the shrimp and comprises a fork mounted to an oscillating arm, the fork constituting a single tine. The clamp assembly is movable in a first direction around a first circular path and the picking assembly movable in a second direction that is opposite the first direction around a second circular path that is adjacent the first circular path such that, during operation, the single tine of the picking assembly longitudinally penetrates the meat of the shrimp at a location adjacent its head region and subsequently removes the meat from the shell in a direction that is perpendicular to the dorsal side of the shrimp.

In one embodiment, the single tine of the picking assembly comprises a curved tine.

In one embodiment, the first jaw includes a first engaging surface for engaging at least a first side shell portion of the shrimp and the second jaw includes a second engaging surface disposed opposite the first engaging surface for engaging at least a second side shell portion of the shrimp that is disposed opposite the first side shell portion of the shrimp.

In one embodiment, the machine further comprises a shoulder carried by the second jaw at a location adjacent the second engaging surface. The shoulder extends from the second jaw away from the center bracket and adapted to engage and apply a force to the second side shell portion of the shrimp to roll the shrimp toward the first clamp.

In one embodiment, the shoulder includes a wedge surface disposed at an angle that is less than ninety degrees relative to the second engaging surface. The wedge surface is for engaging the second side shell portion of the shrimp to apply the force thereto.

In one embodiment, the first and second engaging surfaces are disposed at an angle relative to each other.

Another aspect of the present disclosure provides a method of processing shrimp. The method includes moving first and second opposing jaws of a clamp assembly together such that a first engaging surface on the first jaw engages a first side shell portion of a shrimp shell and a second engaging surface on the second jaw engages a second side shell portion of the shrimp shell that is opposite the first side shell portion of the shrimp shell. Additionally, the method includes forming a perforated seam in the second side shell portion of the shrimp shell. Additionally, the method includes tearing the perforated seam. Still further, the method includes picking the meat of the shrimp from the shrimp shell.

In one embodiment, forming the perforated seam comprises penetrating the second side shell portion of the shrimp shell with a plurality of teeth carried by the second jaw.

In one embodiment, tearing the perforated seam comprises rolling the shrimp toward the first jaw by applying a force to the second side shell portion of the shrimp shell with a shoulder extending from the second jaw.

In one embodiment, picking the meat from the shrimp shell comprises inserting a single tine longitudinally into the head region of the shrimp and moving the single tine in a direction perpendicular to a dorsal side of the shrimp.

DETAILED DESCRIPTION

The present disclosure is directed to an at least semi-automatic shrimp processing machine that is capable of peeling and picking shrimp in the same process. A uniquely conceived arrangement of clamps and a picking assembly can work in conjunction with each other or independently, for example, to provide for a quick and efficient shrimp peeling and picking machine that results in shrimp meat free from aesthetically compromising blemishes such as puncture marks.

Figure 1:
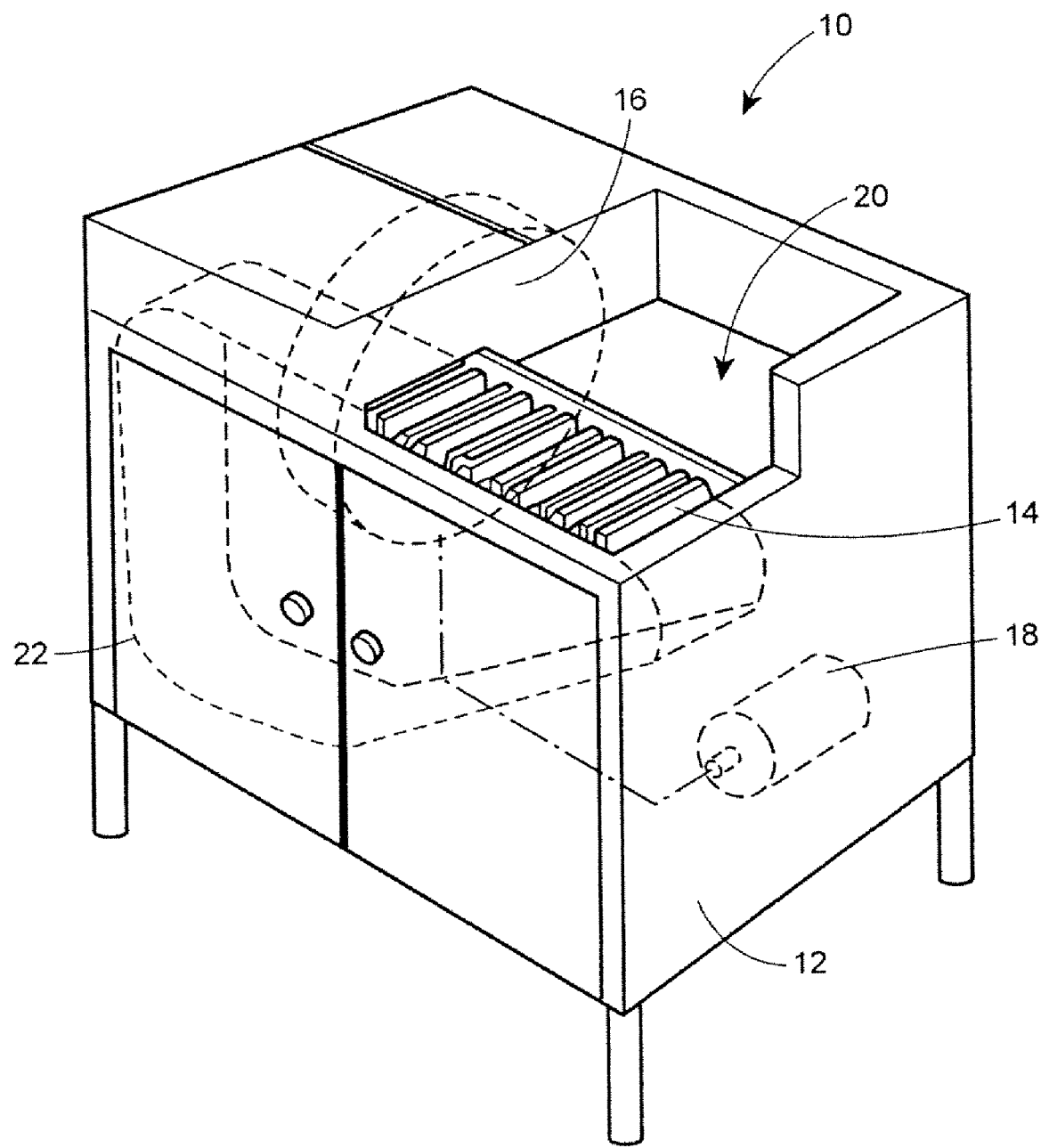
FIG. 1 is a perspective view of a shrimp processing machine constructed in accordance with the principles of the invention.

Referring now to the drawings, FIG. 1 depicts a shrimp processing machine 10 constructed in accordance with the principles of the invention. The general construction and operation of the machine 10 can be similar to any of the shrimp processing machines disclosed in commonly owned U.S. Pat. No. 2,850,761; U.S. Pat. No. 3,214,789; U.S. Pat. No. 3,238,561; and/or U.S. Pat. No. 3,247,542, the entire contents of each of which are hereby expressly incorporated herein by reference. More specifically, the shrimp processing machine 10 disclosed herein includes a housing 12, a plurality of individual loading trays 14, a processing assembly 16, and a motor 18. The housing 12 defines a hopper 20 for receiving unprocessed shrimp (not shown). The plurality of individual loading trays 14 are positioned on a conveyor 22 and move adjacent to the hopper 20. The motor 18 actuates the conveyor 22 and the processing assembly 16 such that during operation, shrimp carried on the loading trays 14 are delivered to the processing assembly 16 for processing.

Figure 2:
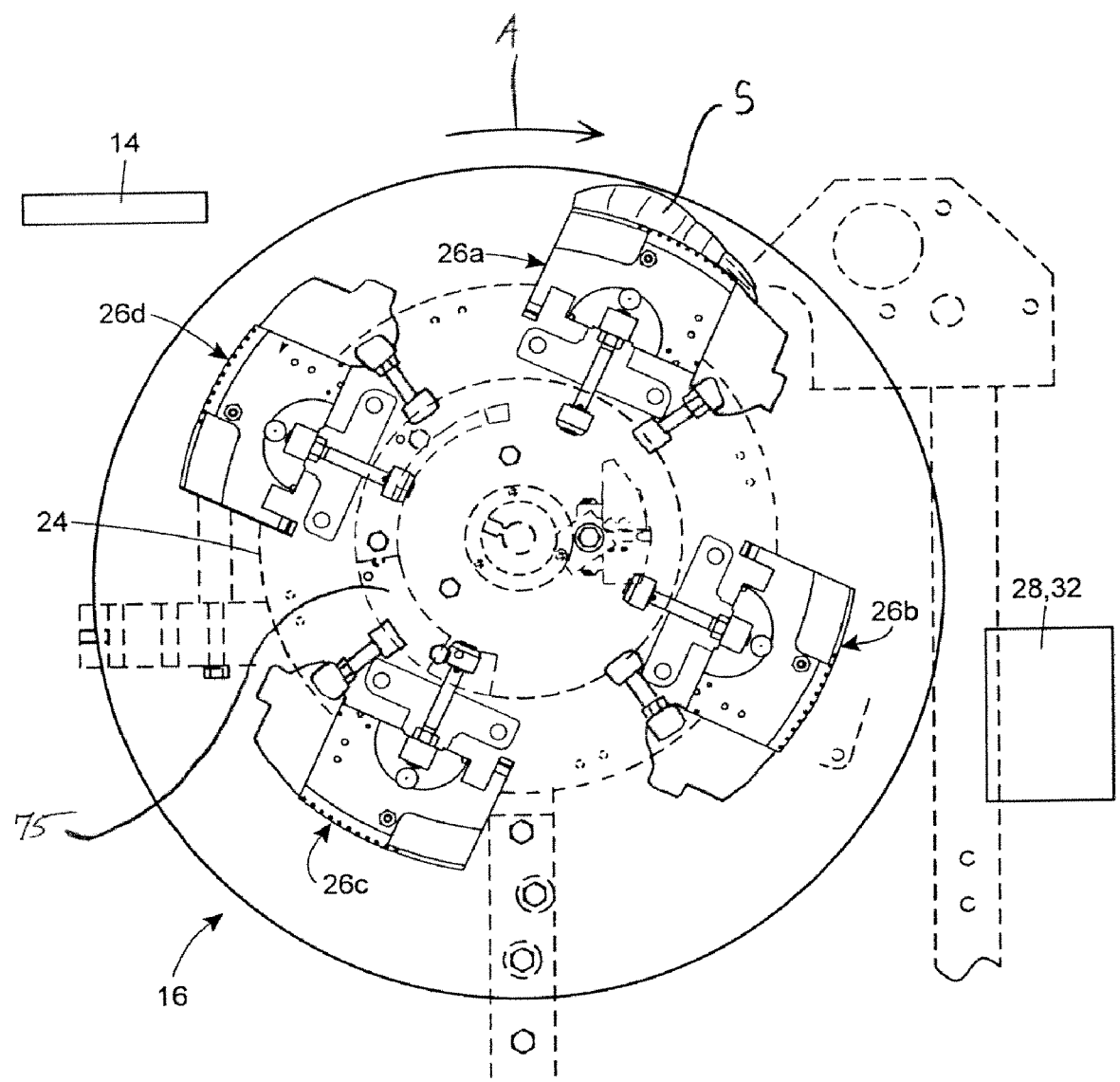
FIG. 2 is a side view of a processing assembly of the shrimp processing machine of FIG. 1.

Turning now to FIG. 2, the processing assembly 16 comprises a carrier wheel 24, a plurality of clamp assemblies 26a-26d and a work station 28. In the disclosed embodiment, the plurality of clamp assemblies 26a-26d includes four clamp assemblies mounted to and circumferentially spaced about the periphery of the carrier wheel 24. Alternative embodiments of the carrier assembly 16, however, can include more or less than four clamp assemblies. For example, on preferred embodiment includes six clamp assemblies. In the disclosed embodiment, the work station 28 comprises a picker assembly 32 for picking the meat from the shrimp. Other embodiments can also include other work stations arranged about the carrier wheel such as, for example, a cutter assembly, a cleaning station, etc.

During operation, the carrier wheel 24 moves in a rotational direction, as indicated by reference arrow A in FIG. 2. As the carrier wheel 24 rotates, the clamp assemblies 26a-26d pass from beneath the plurality of loading trays 14, one of which is schematically illustrated in FIG. 2. As each clamp assembly 26a-26d passes a tray 14, the clamp assembly 26a-26d grasps the shrimp S. In FIG. 2, the clamp assembly identified by reference numeral 26a is illustrated as grasping an entire shrimp S in accordance with the principles of the presently disclosed shrimp processing machine 10. With the shrimp S loaded into a clamp assembly 26a-26d, continued rotation of the carrier wheel 24 moves the shrimp S toward the picking assembly 32 for processing.

Figure 3A:
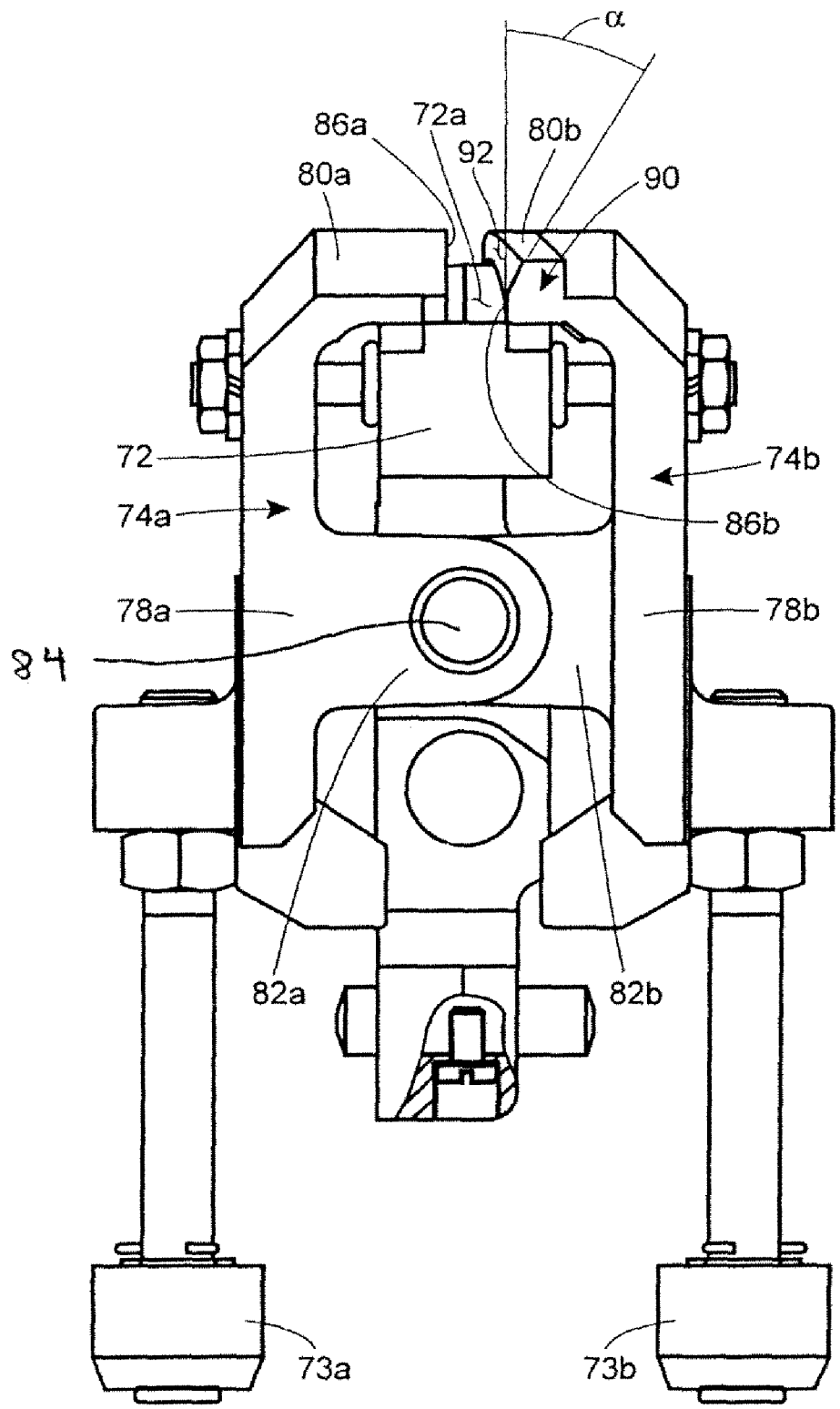
FIG. 3A is a rear view of a clamp of the shrimp processing machine of FIG. 1 and depicted in a closed position.
Figure 3B:
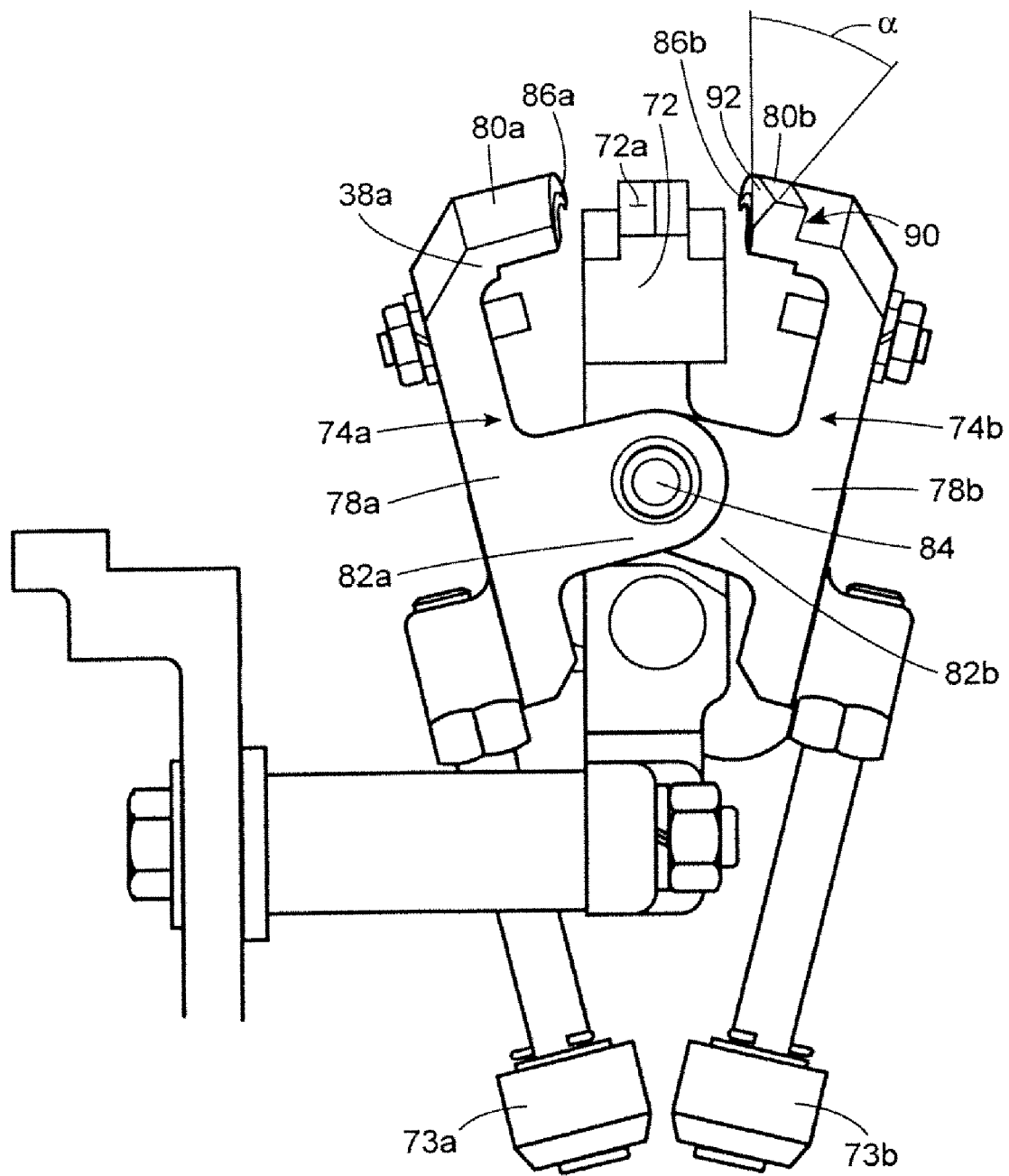
FIG. 3B is a rear view of the clamp of FIG. 3A depicted in an open position.
Figure 4:
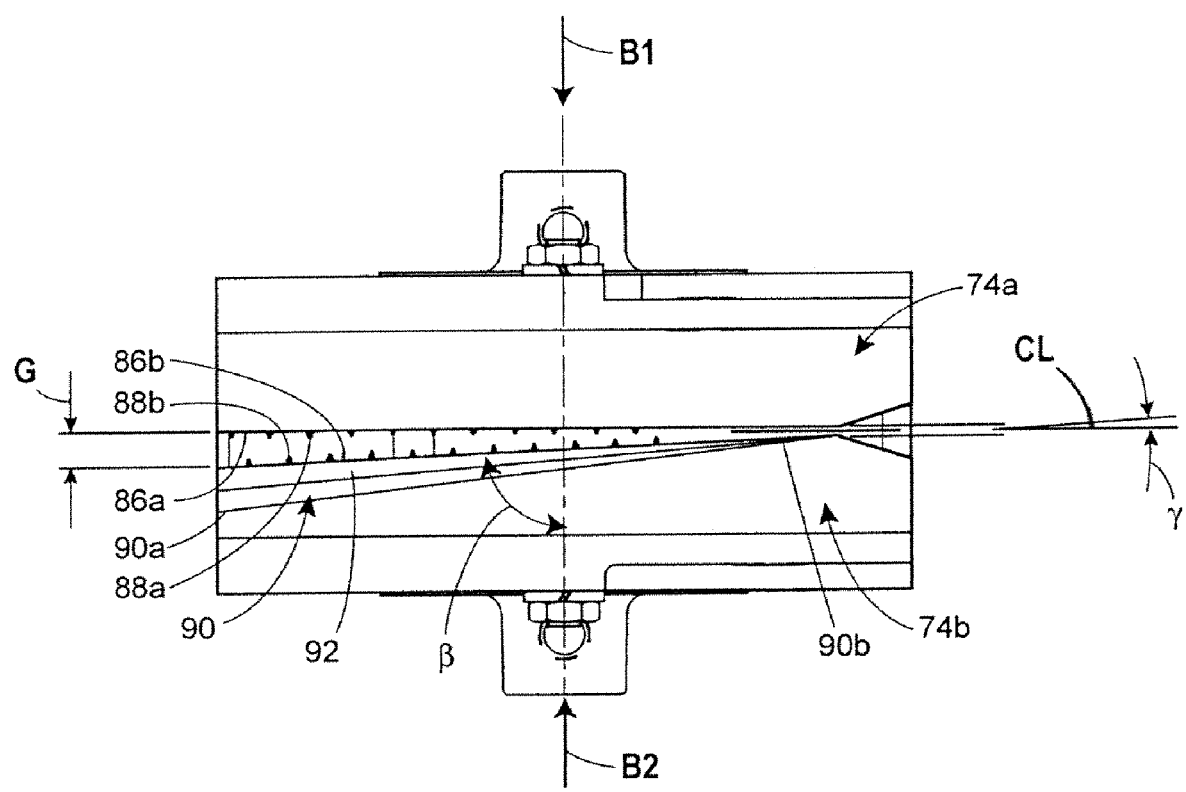
FIG. 4 is a top view of the clamp of FIG. 3A.

Referring now to FIGS. 2, 3A, 3B, and 4, the architecture of each of the clamp assemblies 26a-26d will be described. Each clamp assembly 26a-26d of the shrimp processing machine 10 generally comprises a center bracket 72, first and second clamps 74a, 74b, and first and second cam followers 73a, 73b fixed to the clamps 74a, 74b. The clamps 74a, 74b are adapted to move relative to the center bracket 72 between a closed position, which is illustrated in FIG. 3A, and an open position, which is illustrated in FIG. 3B. More specifically, as depicted in FIG. 4, the first clamp 74a is adapted to move in a closing direction, which is identified by reference arrow B1, into the closed position, and the second clamp 74b is adapted to move in a closing direction, which is identified by reference arrow B2, into the closed position. The closing directions B1, B2 of the first and second clamps 74a, 74b are opposite. It should be appreciated therefore, that the first clamp 74a also moves into the open position by moving in an opening direction that substantially identical to the closing direction B2 of the second clamp 74b, and the second clamp 74b also moves into the open position along an opening direction that is substantially identical to the closing direction B1 of the first clamp 74a. In one embodiment, the first and second clamps 74a, 74b can be biased by a spring (not shown) into the open or the closed position, for example.

During operation of the shrimp processing machine 10 and while the carrier wheel 24 rotates in the direction A illustrated in FIG. 2, the movement of the clamps 74a, 74b between the closed position and the open position can be effected by a pair of cams 75, only one of which is visible in FIG. 2, carried by the housing 12 of the processing machine 10. The cams would operatively engage the cam followers 73a, 73b as the clamp assemblies 26a-26d rotate with the carrier wheel 24. The mechanics of such operation can be based on the mechanics described in commonly owned U.S. Pat. No. 4,745,660 and/or U.S. Pat. No. 4,769,871, the entire contents of each of which are hereby expressly incorporated herein by reference.

As depicted in FIGS. 3A, 3B, and 4, the center bracket 72 of each of the clamp assemblies 26a-26d includes a support surface 72a adapted to support the ventral side of a shrimp S. As such, the support surface 72a is convex in shape to accommodate the natural concave shape of the ventral side of a typical shrimp. The first and second clamps 74a, 74b are therefore adapted to constrain the shrimp S on the center bracket 72 and each includes a body 78a, 78b, respectively, and a jaw 80a, 80b, respectively. The bodies 78a, 78b include flanges 82a, 82b, respectively, that are pivotally disposed on a common pin 84, as shown in FIG. 3A. So configured, the clamps 74a, 74b of the presently disclosed embodiment are pivotable between the open and closed positions. While the clamps 74a, 74b of the disclosed embodiment open and close via pivoting movement, in alternative embodiments, the clamps 74a, 74b could open and close via sliding movement, or some other type of movement, for example.

The first jaw 80a of the first clamp 74a includes a first engaging surface 86a and the second jaw 80b of the second clamp 74b includes a second engaging surface 86b. The first and second engaging surfaces 86a, 86b are adapted to grasp opposing first and second side shell portions of a shrimp shell during operation, as generally illustrated in FIG. 1, for example, and as will be described in more detail below with reference to FIGS. 6A-6D.

As shown in FIG. 4, the first engaging surface 86a is disposed approximately perpendicularly to the closing directions B1, B2 of the first and second clamps 74a, 74b, while the second engaging surface 86b is disposed at an angle β relative to the closing directions B1, B2 of the first and second clamps 74a, 74b. As such, the second engaging surface 86b of the second clamp 74b is also disposed at an angle γ relative to the first engaging surface 86a of the first clamp 74a. In the disclosed embodiment, the angle β is less than ninety degrees (90°), and can be in the range of approximately twenty degrees (20°) to approximately seventy degrees (70°), for example. The angle γ can also be less than ninety degrees (90°), and can be in the range of approximately three degrees (3°) to approximately seventy degrees (70°), for example. So configured, each of the clamp assemblies 26a-26d define a gap G between the first and second engaging surfaces 86a, 86b of the first and second clamps 74a, 74b that can be described as being asymmetrical. That is, the gap G is disposed asymmetrical relative to a centerline CL of each of the clamp assemblies 26a-26d, as depicted in FIG. 4. The gap G is adapted to receive and accommodate at least a portion of the shrimp S during processing.

As is also depicted in FIG. 4, the first clamp 74a includes a first plurality of teeth 88a carried by the first engaging surface 86a and the second clamp 74b includes a second plurality of teeth 88b carried by the second engaging surface 86b. As will be discussed in more detail below, the first and second pluralities of teeth 88a, 88b penetrate the shell of the shrimp S to retain the shrimp S between the first and second clamps 74a, 74b during the shrimp processing operation. In the depicted embodiment, the first and second pluralities of teeth 88a, 88b are offset from each other. In some embodiments, the teeth 88a, 88b can be of such length that they become interleaved with each other when the clamps 74a, 74b are in the closed position shown in FIG. 4. So configured, the first and second pluralities of teeth 88a, 88b do not interfere with the opening and closing movement of the first and second clamps 74a, 74b. Additionally, each of the teeth in the first and second pluralities of teeth 88a, 88b can be generally identical, or they can be different. For example, in one embodiment, each of the second plurality of teeth 88b can be thicker than each of the first plurality of teeth 88a.

Referring back to FIGS. 3A and 3B, the second clamp 74b includes a shoulder 90 extending from the second jaw 80b away from the center bracket 72 at a location adjacent to the second engaging surface 86b. In the disclosed embodiment, the shoulder 90 extends generally perpendicularly away from the support surface 72a of the center bracket 72 when the first and second clamps 74a, 74b are in the closed position, as depicted in FIG. 3A, for example. The shoulder 90 includes a wedge surface 92 that is disposed at an angle α relative to the second engaging surface 86b. In the disclosed embodiment, the angle α is less than ninety degrees, and in one embodiment, can be in a range of approximately twenty degrees (20°) to approximately seventy degrees (70°). In one embodiment, the shoulder 90 and wedge surface 92 can generally uniformly taper from a thick rearward portion 90a, as shown in FIG. 4, to a thin forward portion 90b. Such a tapered construct could be designed to accommodate the natural taper of a shrimp S, for example. However, it should be appreciated that in other embodiments, the shoulder 90 and/or the wedge surface 92 can extend generally uniformly along the entire length of the second clamp 74b.

With the first and second clamps 74a, 74b arranged and configured as described above, the clamp assemblies 26a-26d are designed to tear the shell of the shrimp S open along a seam that is disposed at a side portion of the shrimp shell. Specifically, FIGS. 6A and 6B schematically illustrate the first and second clamps 74a, 74b during this aspect of the operation. As the first and second clamps 74a, 74b close along the closing directions B1, B2, the first and second pluralities of teeth 88a, 88b engage and penetrate respective first and second side shell portions Sa, Sb of the shrimp S. Preferably, the first plurality of teeth 88a include fine sharp teeth that finely penetrate the first side shell portion Sa of the shell Ss of the shrimp S. The object is that the first plurality of teeth 88a engage and secure the shell Ss of the shrimp S in the clamp assembly 26a-26d. In contrast, the second plurality of teeth 88b can include slightly thicker teeth adapted to create larger perforations in the second side shell portion Sb of the shell Ss. As such, the second plurality of teeth 88b create a perforated seam in the second side shell portion Sb of the shell Ss. Continued movement of the clamps 74a, 74b along the closing directions B1, B2, causes the wedge surface 92 of the shoulder 90 on the second jaw 74b to engage the second side shell portion Sb of the shrimp shell Ss and apply a force thereto along a direction D illustrated in FIG. 6B. As such, the shoulder 90 causes the shrimp S to roll toward the first clamp 74a, during which the perforated seam in the second side shell portion Sb of the shrimp shell Ss tears, as illustrated in FIG. 6B. More specifically, the shoulder 90 causes the shrimp S to roll onto a receiving surface 96 of the first clamp 74a. Although not depicted in FIG. 6B for the sake of clarity, the support surface 72a of the center bracket 72 is located closer to the receiving surface 96 of the first jaw 74a than the shoulder 90 of the second jaw 74b. As such, the receiving surface 96 serves as a fulcrum that supports the rolling movement of the shrimp S, which facilitates the tearing along the perforated seam created by the second plurality of teeth 88b on the second jaw 74b. With the perforated seam torn, as depicted in FIG. 6B, the shrimp meat Sm can be removed from the shrimp shell Ss with a picker assembly 100, as illustrated in FIG. 5, for example.

Figure 5:
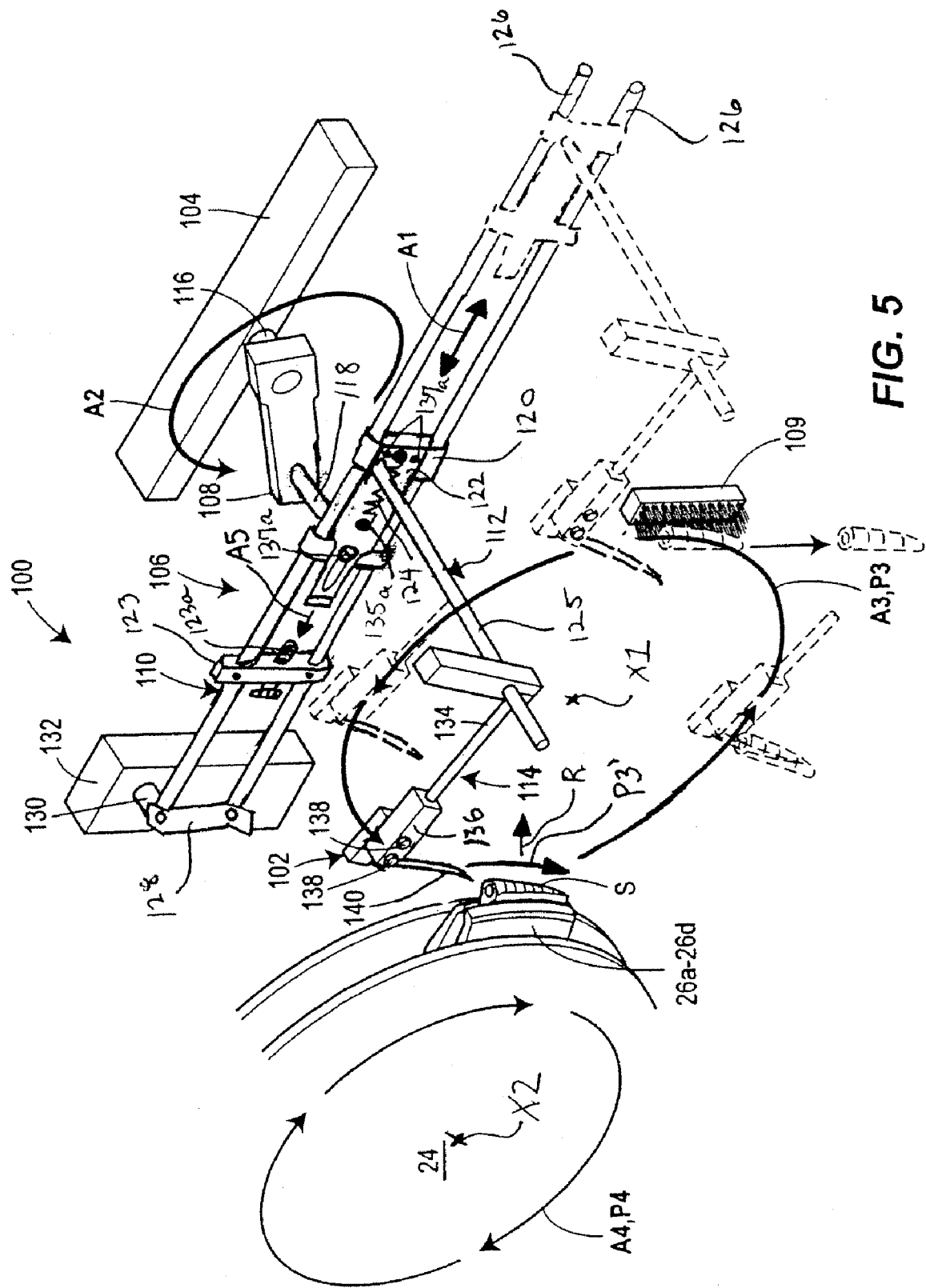
FIG. 5 is a perspective view of one embodiment of a picker assembly constructed in accordance with the principles of the present invention.
Figure 6A:
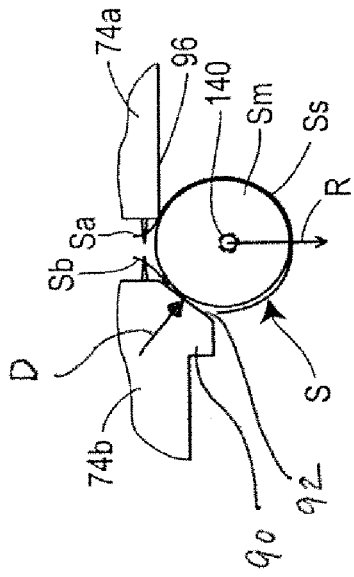
FIGS. 6A-6D are schematic illustrations of a process of picking meat from a shrimp shell using the picker assembly of FIG. 5.
Figure 6B:
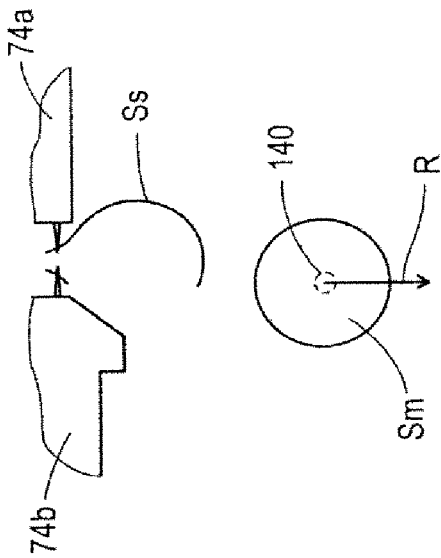

The picker assembly 100 in FIG. 5 includes an oscillating fork 102 adapted to longitudinally penetrate the shrimp meat Sm at a location previously occupied by the shrimp head, i.e., the head region, and remove the shrimp meat Sm from the shrimp shell Ss in a direction R that is generally perpendicular to the dorsal side of the shrimp S.

More specifically, the picker assembly 100 includes the fork 102, an actuator 104, a drive linkage 106, and a brush 109. The actuator 104 drives the drive linkage 106 and moves the fork 102 around a modified circular path P3 in a direction illustrated by the plurality of arrows A3, as will be described below. During movement, the fork 102 occupies generally the same orientation at all positions along the path P3, as illustrated in phantom.

The actuator 104 can include, for example, an electric motor. The drive linkage 106 includes a driven arm 108, a rack 110, a slide assembly 112, and a picker arm 114. A first end of the driven arm 108 is attached to an output shaft 116 of the actuator 104 and adapted to rotate in the direction of arrow A2. A second end of the driven arm 108 is operably coupled to the slide assembly 112 and rack 110, via a rotating coupler 118.

The rack 110 includes a pair of elongate guide rods 126 connected at one end by an end plate 128. The end plate 128 is attached to a pivot pin 130, which is connected to a fixed component 132, which may form part of the housing 12 of the shrimp processing machine 10 depicted in FIG. 1, for example. In another embodiment, the end plate 128 of the rack 110 can be rotatably supported on a shaft extending from the carrier wheel 24, instead of the pivot pin 130 and fixed component 132.

The slide assembly 112 includes a slide block 120, a slide plate 122, a spring 124, a stopper 123, and an extension arm 125. The slide block 120 is slidably mounted on the elongate rods 126 of the rack 110. The slide plate 122 is slidably mounted to the slide block 120. The spring 124 includes a coil spring that is connected between the slide block 120 and the slide plate 122. The stopper 123 includes an adjustable set screw 123a that extends toward the slide block 120 and slide plate 122 for being periodically engaged by the slide plate 122 during operation of the machine, as will be described.

Figure 5A:
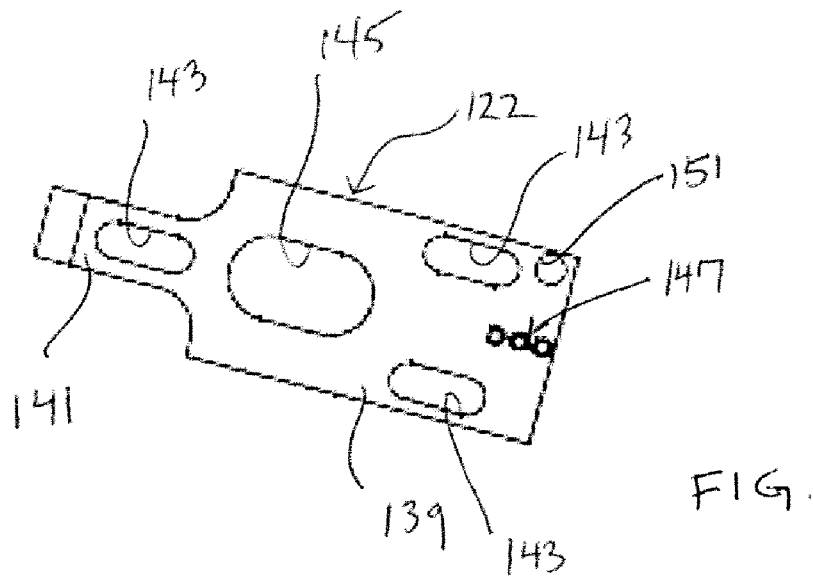
FIG. 5A is a side view of a slide plate of the embodiment of the picker assembly of FIG. 5.
Figure 5B:
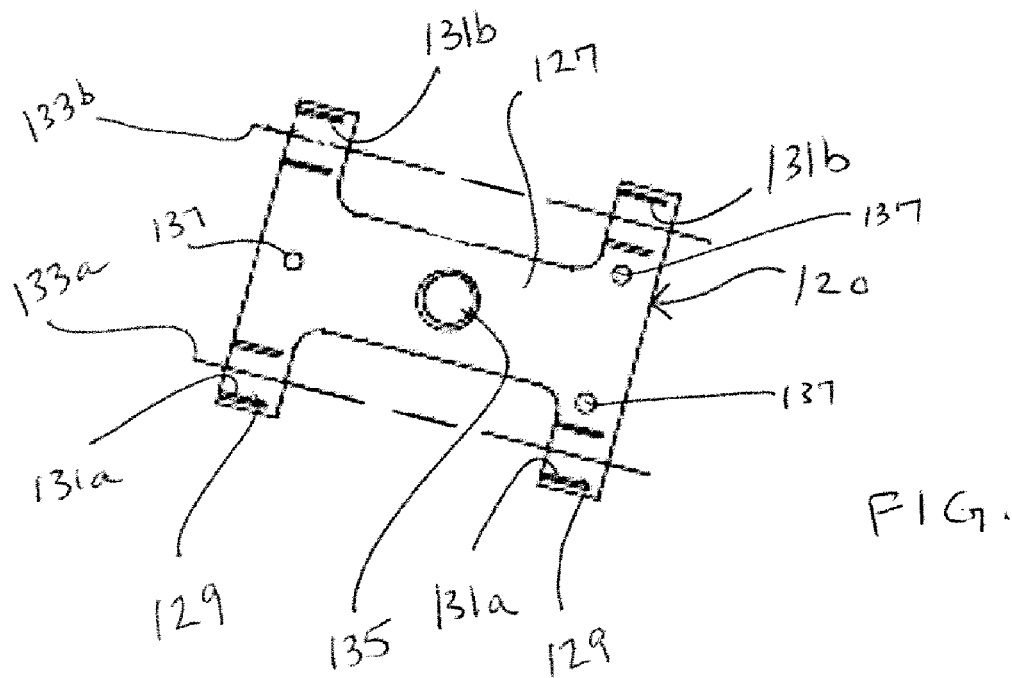
FIG. 5B is a side view of a slide block of the embodiment of the picker assembly of FIG. 5.

With reference to FIG. 5B, the slide block 120 of the slide assembly 112 includes a single piece of material machined or formed into a generally I-shaped configuration. More specifically, the slide block 120 includes a central portion 127 extending between a pair of end portions 129. The end portions 129 define throughbores 131a, 131b extending along parallel axes 133a, 133b. When assembled on the elongate rods 126 of the rack 110, the throughbores 131a, 131b receive the elongate rods 126 such that that slide block 120 is slidably mounted thereon. In one embodiment, the slide block 120 can include bearings (not shown) positioned within the throughbores 131a, 131b to facilitate sliding movement relative to the elongate rods 126. As is also depicted in FIG. 5B, the central portion 127 of the slide block 120 includes a threaded bore 135 for receiving a threaded fastener 135a for fixing a first end of the spring 124 thereto, as depicted in FIG. 5. Moreover, the slide block 120 includes three additional threaded bores 137 for receiving threaded fasteners 137a (shown in FIG. 5) that slidably attach the slide plate 122 to the slide block 120.

With reference to FIG. 5A, the slide plate 122 includes a generally rectangular plate portion 139 and a tongue portion 141. As mentioned above, the slide plate 122 is adapted to be slidably mounted to the slide block 120 and therefore includes three elongate mounting openings 143. When assembled onto the slide block 120, the elongate mounting openings 143 are disposed around the three threaded fasteners 137a disposed in the corresponding three threaded bores 137 in the slide block 120. So configured, during operation, the slide plate 122 is free to move relative to the three threaded fasteners 137a and the slide block 120. Moreover, the slide plate 122 includes a central opening 145 for accommodating the fastener 135a that secures the first end of the spring 124 to the slide block 120 without interference. Further, the slide plate 122 includes a plurality of attachment points 147 that may include openings, hooks, or otherwise and which are adapted to receive a corresponding hook on the spring 124 to secure a second end of the spring 124 to the slide plate 122, as shown in FIG. 5, for example. With the spring 124 so mounted, the spring 124 biases the slide plate 122 relative to the slide block 120 in the direction indicated by reference arrow A5 in FIG. 5 for facilitating operation of the picker assembly 100, as will be described. Finally, the slide plate 122 includes a mounting aperture 151 for fixedly connecting to the extension arm 125, which ultimately supports the picker arm 114.

Referring back to FIG. 5, the picker arm 114 includes an extension arm 134, a connector 136, and the fork 102. In the disclosed embodiment, the fork 102 includes a single tine 140 fixedly connected to and extending away from the connector 136. In FIG. 5, the single tine 140 is slightly curved to facilitate picking of the shrimp meat Sm. In the disclosed embodiment, the tine 140 is curved such that it bends with the natural contour of the shrimp meat Sm. Other embodiments could be arranged differently. The connector 136 may include one or more set screws 138 for releasably securing the single tine 140 thereto. As such, the single tine 140 can be interchanged with one or more different tines having different curvatures, or no curvature at all, to accommodate different processing operations. In yet further embodiments, the fork 102 can include multiple tines, if desired.

With the picker assembly 100 configured as described, and as mentioned above, the single tine 140 is adapted to penetrate the shrimp meat Sm and remove it from the shrimp shell Ss in a direction R that is generally perpendicular to the dorsal side of the shrimp S. More specifically, during operation, the carrier wheel 24, the clamp assemblies 26a-26b, and the shrimp meat Sm carried by the clamp assemblies 26a-26d move along a circular path P4 in a direction indicated by reference arrows A4 in FIG. 5. The circular path P4 occupied by the clamp assemblies 26a-26d is disposed adjacent to the circular path P3 occupied by the movement of the fork 102 of the picker assembly 100 to effectuate removal of the shrimp meat Sm from the shell Ss. Moreover, as shown in FIG. 5, the direction of movement A4 of the clamp assemblies 26a-26d along the circular path P4 is opposite to the direction of movement A3 of the fork 102 along its respective circular path P3. That is, for the sake of description, the direction of movement A4 around the circular path P4 is generally clockwise relative to the orientation of FIG. 5, and the direction of movement A3 around the circular path P3 is generally counterclockwise relative to the orientation of FIG. 5.

During operation, the actuator 104 drives the driven arm 108 along its direction of movement A2, which causes the sliding assembly 112 to slide back and forth on the rack 110 and rotate in a circular path that is generally similar to the circular path P3 of the fork 102. This also causes the rack 110 to pivot in an oscillating fashion relative to the pivot pin 130. The rotational motion of the sliding assembly 112 transfers to the fork 102 such that the fork 102 cyclically interacts with the carrier wheel 24 and clamp assemblies 26a-26d to pick the shrimp meat Sm from the shrimp shells Ss.

Figure 5C:
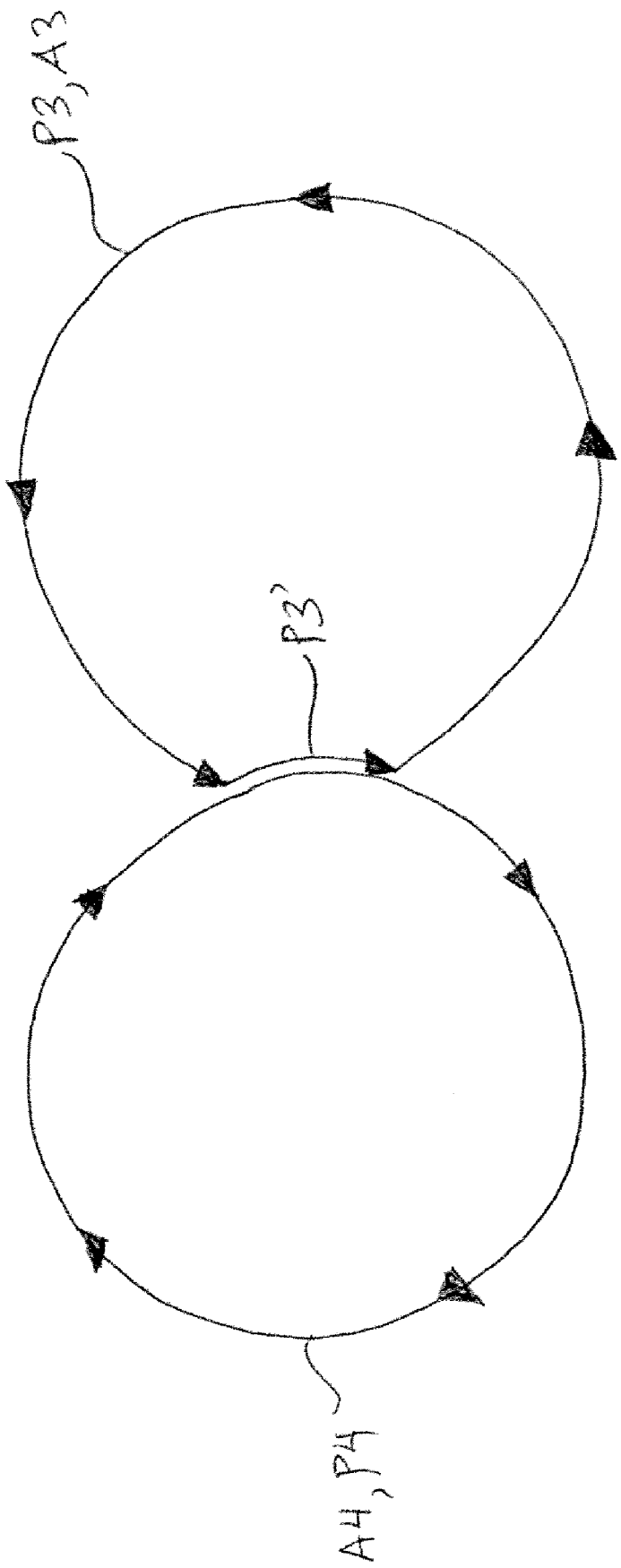
FIG. 5C is a schematic representation of a travel path of a fork of the picker assembly of FIG. 5.

More specifically, as the fork 102 and clamp assemblies 26a-26d move along their respective circular paths P3, P4, the single tine 140 can enter the head region of the shrimp S and penetrate the shrimp meat Sm along the longitudinal direction of the shrimp S. To facilitate this penetration, the circular path P3 of the fork 102 includes a hitch portion P3' at a location adjacent to the circular path P4 of the clamp assemblies 26a-26d. The hitch portion P3' of the circular path P3 includes a shape and direction that is different from the remainder of the circular path P3 of the fork 102. That is, in the disclosed embodiment, as the fork 102 travels along the circular path P3, it generally travels at a fixed distance around a first axis point X1. However, as the fork 102 travels through the hitch portion P3', it travels at a fixed distance relative to a second axis point X2 that is different from the first axis point X1. In the present embodiment, the second axis point X2 can be positioned at the rotational axis of the carrier wheel 24 and clamp assemblies 26a-26d. Therefore, during the brief time period that the tine 140 of the fork 102 penetrates the shrimp meat Sm, the tine 140 and the shrimp meat Sm carried by the clamp assembly 26a, 26d are traveling on substantially identical arcuate paths, i.e., an arcuate path indicated by the hitch portion P3' shown in FIG. 5. The interaction between the hitch portion P3' of the circular path P3 of the fork 102 and tine 140 and the circular path P4 of the clamp assemblies 26a, 26d and the shrimp meat Sm is illustrated schematically in FIG. 5C. While FIG. 5C illustrates the two circular paths P3 and P4 as being generally equal in size, this is just a schematic illustration for descriptive purposes, the actual sizes may be different or the same depending on the particular application. Moreover, while FIG. 5C illustrates the hitch portion P3' of the circular path P3 of the fork 102 and tine 140 as slightly removed from the circular plath P4 of the clamp assemblies 26a-26d and shrimp meat Sm, in actual operation the tine 140 and the longitudinal axis of the shrimp meat Sm can generally share a common travel path at the hitch portion P3'.

The hitch portion P3' in the circular path P3 is caused by the tongue portion 141 of the slide plate 122 on the slide assembly 112 momentarily engaging the set screw 123a of the stopper 123 mounted on the rack 110. For example, as the actuator 104 drives the driven arm 108, the driven arm 108 moves the slide block 120 and slide plate 122 around a circular path, which in turn causes the fork 102 and tine 140 to travel around their circular path P3. However, as the slide block 120 and slide plate 122 are moved, they also slide back and forth along the elongate rods 126 of the rack 110, as discussed above. As such, when the slide assembly 112 begins to move the fork 102 and tine 140 toward the clamp assemblies 26a-26d, the slide block 120 and slide plate 122 move on the elongate rods 126 toward the stopper 123. Continued rotation causes the tongue portion 141 of the slide plate 122 to engage the set screw 123a on the stopper 123. This momentarily causes the slide plate 122 to stop moving relative to the elongate rods 126. Continued rotation of the slide block 120 however causes the slide block 120 to continue moving toward the stopper 123, which compresses the spring 124 and moves the slide block 120 relative to the slide plate 122.

Further rotation of the driven arm 108 ultimately causes the slide block 120 to move into its original position relative to the slide plate 122 and move the slide plate 122 out of engagement with the set screw 123a on the stopper 123. It is during this period of time when the tongue 141 on the slide plate 122 engages the set screw 123a that the fork 102 and tine 140 travel through the hitch portion P3' of the circular path P3. Once the tongue 141 disengages from the set screw 123a, the fork 102 and clamp assemblies 26a-26d begin to move apart, which allows the fork 102 to remove the shrimp meat Sm from the shrimp shell Ss.

Figure 6C:
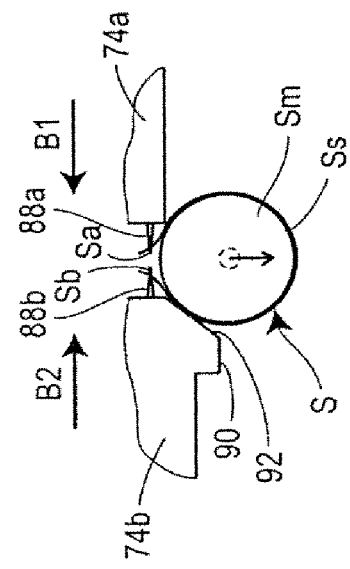
Figure 6D:
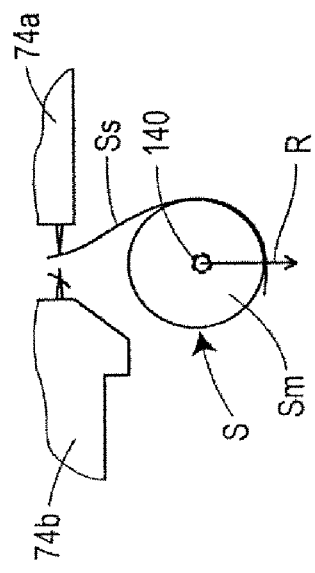

For example, FIG. 6B schematically depicts an end view of the single tine 140 of the fork 102 inserted into the shrimp meat Sm while the clamps 74a, 74b of a clamp assembly 26a-26d grasp the shrimp shell Ss, but after the perforated seam has been torn, as discussed above. Moreover, the direction of movement of the tine 140 relative to the clamp assembly 26a-26d is indicated with reference character R, similar to that which is shown in FIG. 5. Therefore, as the tine 140 exits the hitch portion P3' of the circular path P3, it moves away from the clamp assembly 26a-26d and the shrimp meat Sm forces the first side shell portion Sa of the shrimp shell Ss to begin opening, as shown in FIG. 6C, for example. Continued movement of the tine 140 causes the shrimp shell Ss to continue opening until the shrimp meat Sm and tine 140 are completely free from the shrimp shell Ss, as depicted in FIG. 6D, for example. When this occurs, the shrimp shell Ss typically remains open and extended away from the clamps 74a, 74b, as shown, but can recoil toward its original form and away from the shrimp meat Sm. In either situation, the tine 140 is free to carry the shrimp meat Sm away from the shell Ss for further processing and/or packaging. It is foreseeable that during this process, it may be beneficial for the shrimp meat Sm to roll out of the shell Ss, thereby carefully disconnecting any tissue that secures the two together to minimize damaging the shrimp meat Sm. The present picker assembly 100 advantageously facilitates such rolling by providing the single tine 140, which does not interfere with the rolling.

Continued movement of the tine 140 along the circular path P3 illustrated in FIG. 5 causes the shrimp meat Sm to engage the brush 109 to be removed from the tine 140. The brush 109 can include any type of brush capable of providing frictional resistance to the shrimp meat Sm without causing physical blemishes. As the tine 140 moves passed the brush 109, the brush 109 engages the shrimp meat Sm such that the tine 140 pulls out of the shrimp meat Sm and the shrimp meat Sm falls under the force of gravity, as depicted, into a collection bin, for example, for further processing and/or packaging. The fork 102 then continues along its circular path P3 to meet the next clamp assembly 26a-26d and repeat the above process.

In light of the foregoing, the present disclosure provides a unique shrimp processing machine that efficiently clamps shrimp and breaks or tears a perforated seam along a side portion thereof, thereby eliminating the need to use a blade or cutter to separate the shell, which can oftentimes penetrate beyond the shell and into the shrimp meat causing aesthetically displeasing blemishes on the shrimp meat. Moreover, the present disclosure provides a unique picker assembly that utilizes a fork traveling along a unique travel path, at least a portion of which is common to the travel path of the shrimp meat. So configured, the fork longitudinally penetrates the shrimp meat from its head region and removes the meat from the shell in a direction that is generally perpendicular to the dorsal side of the shrimp. So configured, the picker assembly ensures that the dorsal and side portions of the shrimp meat remain essentially unblemished, thereby advantageously maximizing the aesthetic appeal of the final shrimp meat product.

It should be appreciated that the foregoing description provides merely an example of the invention, and the invention is not intended to be limited to any of the embodiments described herein, but rather, is defined to include that which is recited in the following claims and all equivalents thereof.

What is claimed is:

1. A clamp assembly for a shrimp processing machine, the clamp assembly comprising:
    a center bracket defining a support surface for supporting the ventral side of a shrimp during a shrimp preparation process;
    a first clamp mounted relative to the center bracket;
    a second clamp mounted relative to the center bracket, the first and second clamps being movable relative to each other between an open position and a closed position;
    a first jaw carried by the first clamp and including a first engaging surface for engaging at least a first side shell portion of the shrimp when the first clamp moves toward the closed position;
    a second jaw carried by the second clamp and including a second engaging surface, the second engaging surface being disposed opposite the first engaging surface for engaging at least a second side shell portion of the shrimp that is disposed opposite the first side shell portion of the shrimp when the second clamp moves toward the closed position; and
    a shoulder carried by the second jaw at a location adjacent the second engaging surface, the shoulder extending from the second jaw away from support surface of the center bracket and adapted to engage and apply a force to the second side shell portion of the shrimp when the second clamp moves toward the closed position to roll the shrimp toward the first clamp.

2. The clamp assembly of claim 1, wherein the shoulder includes a wedge surface disposed at an angle that is less than ninety degrees relative to the second engaging surface, the wedge surface for engaging the second side shell portion of the shrimp when the second clamp moves toward the closed position.

3. The clamp assembly of claim 1, further comprising a first plurality of teeth extending from the first engaging surface and a second plurality of teeth extending from the second engaging surface, the first and second pluralities of teeth being adapted to penetrate the first and second side shell portions of the shrimp, respectively, when the first and second clamps move toward the closed position.

4. The clamp assembly of claim 3, wherein the first plurality of teeth are offset from the second plurality of teeth such that the first and second pluralities of teeth are interleaved when the first and second jaws move toward the closed position.

5. The clamp assembly of claim 3, wherein each of the second plurality of teeth has a thickness that is larger than a thickness of each of the first plurality of teeth such that the second plurality of teeth create a perforated seam along the second side shell portion of the shrimp, the perforated seam being torn when the shoulder on the second jaw rolls the shrimp toward the first jaw.

6. The clamp assembly of claim 1, further comprising an asymmetrical gap disposed between the first and second engaging surfaces of the first and second clamps, the gap being adapted to receive at least the first and second side shell portions of the shrimp.

7. The clamp assembly of claim 1, wherein the first and second engaging surfaces are disposed at an angle relative to each other.

8. The clamp assembly of claim 7, wherein the first engaging surface is disposed substantially perpendicularly to a direction of movement of the first and second clamps toward the closed position, and the second engaging surface is disposed at an angle that is less than ninety degrees relative to the direction of movement of the first and second clamps toward the closed position.

9. The clamp assembly of claim 1, wherein the first jaw includes a receiving surface disposed substantially perpendicularly to the first engaging surface, the receiving surface being adapted to receive the shrimp as it is rolled toward the first clamp, the receiving surface being disposed closer to the central bracket than the shoulder on the second jaw.

10. A shrimp processing machine, comprising:
    a clamp assembly comprising a center bracket and first and second jaws, the center bracket having a support surface and the first and second jaws being adapted to engage opposite sides of a shrimp to secure the ventral side of the shrimp on the support surface; and
    a picking assembly for removing the meat of the shrimp from the shell of the shrimp, the picking assembly comprising a fork mounted to an oscillating arm, the fork comprising a single tine,
    the clamp assembly being movable in a first direction around a first circular path and the picking assembly being movable in a second direction that is opposite the first direction around a second circular path that is adjacent the first circular path such that, during operation, the single tine of the picking assembly longitudinally penetrates the meat of the shrimp at a location adjacent the shrimp's head region and subsequently removes the meat from the shell in a direction that is perpendicularly to the dorsal side of the shrimp.

11. The machine of claim 10, wherein the single tine of the picking assembly constitutes a single tine.

12. The machine of claim 10, wherein the first jaw includes a first engaging surface for engaging at least a first side shell portion of the shrimp and the second jaw includes a second engaging surface disposed opposite the first engaging surface for engaging at least a second side shell portion of the shrimp that is disposed opposite the first side shell portion of the shrimp.

13. The machine of claim 12, further comprising a shoulder carried by the second jaw at a location adjacent the second engaging surface, the shoulder extending from the second jaw away from the center bracket and adapted to engage and apply a force to the second side shell portion of the shrimp to roll the shrimp toward the first clamp.

14. The machine of claim 13, wherein the shoulder includes a wedge surface disposed at an angle that is less than ninety degrees relative to the second engaging surface, the wedge surface for engaging the second side shell portion of the shrimp to apply the force thereto.

15. The machine of claim 12, wherein the first and second engaging surfaces are disposed at an angle relative to each other.

16. A method of processing shrimp, the method comprising:
    moving first and second opposing jaws of a clamp assembly together such that a first engaging surface on the first jaw engages a first side shell portion of a shrimp shell and a second engaging surface on the second jaw engages a second side shell portion of the shrimp shell that is opposite the first side shell portion of the shrimp shell;

forming a perforated seam in the second side shell portion of the shrimp shell;

tearing the perforated seam; and picking the meat of the shrimp from the shrimp shell.

17. The method of claim 16, wherein forming the perforated seam comprises penetrating the second side shell portion of the shrimp shell with a plurality of teeth carried by the second jaw.

18. The method of claim 16, wherein tearing the perforated seam comprises rolling the shrimp toward the first jaw by applying a force to the second side shell portion of the shrimp shell with a shoulder extending from the second jaw.

19. The method of claim 16, wherein picking the meat from the shrimp shell comprises inserting a single tine longitudinally into the head region of the shrimp and subsequently moving the single tine in a direction perpendicularly to a dorsal side of the shrimp to remove the meat from the shrimp shell.

* * * * *